(12) United States Patent
Ito

(10) Patent No.: US 10,145,048 B2
(45) Date of Patent: Dec. 4, 2018

(54) CLUTCH DEVICE AND WASHING MACHINE

(71) Applicant: NIDEC SANKYO CORPORATION, Suwa-gun, Nagano (JP)

(72) Inventor: Akihiro Ito, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 235 days.

(21) Appl. No.: 15/036,179

(22) PCT Filed: Nov. 7, 2014

(86) PCT No.: PCT/JP2014/079517
§ 371 (c)(1),
(2) Date: May 12, 2016

(87) PCT Pub. No.: WO2015/072397
PCT Pub. Date: May 21, 2015

(65) Prior Publication Data
US 2016/0298277 A1   Oct. 13, 2016

(30) Foreign Application Priority Data
Nov. 14, 2013   (JP) ................... 2013-235965

(51) Int. Cl.
*D06F 37/30* (2006.01)
*D06F 37/40* (2006.01)
(Continued)

(52) U.S. Cl.
CPC ............ *D06F 37/304* (2013.01); *D06F 37/40* (2013.01); *F16D 11/00* (2013.01); *F16D 23/12* (2013.01)

(58) Field of Classification Search
CPC ........ D06F 37/304; D06F 37/40; F16D 11/00; F16D 23/12
See application file for complete search history.

(56) References Cited

U.S. PATENT DOCUMENTS 7,171,715 B2 *   2/2007   Yoon ...................... D06F 37/40
68/12.24

FOREIGN PATENT DOCUMENTS

| JP | 2004225734 A | 8/2004 |
|---|---|---|
| JP | 2005229660 A | 8/2005 |

OTHER PUBLICATIONS

Machine Translation of Hamaguchi et al., JP 2004-225734, Aug. 2004. (Year: 2004).*

(Continued)

*Primary Examiner* — David G Cormier
(74) *Attorney, Agent, or Firm* — Cantor Colburn LLP

(57) ABSTRACT

A clutch device may include; a first rotor body; a second rotor body engageable with the first rotor body; a clutch drive motor connected with a first drive line and a second drive line; a clutch mechanism; a first switch comprising first and second contact point electrodes; a second switch comprising first and second contact point electrodes; a first terminal electrically connected with of the first contact point electrode of the first switch; a second terminal electrically connected with the first drive line; a third terminal electrically connected with the first contact point electrode of the second switch; and a fourth terminal electrically connecting with the second drive line. The second contact point electrode of the first switch and the second contact point electrode of the second switch may be electrically connected with the second drive line.

14 Claims, 13 Drawing Sheets

(51) Int. Cl.
*F16D 11/00* (2006.01)
*F16D 23/12* (2006.01)

(56) References Cited

OTHER PUBLICATIONS

International Search Report corresponding to Application No. PCT/JP2014/079517; dated Feb. 3, 2015, with English translation.

\* cited by examiner

CLUTCH DEVICE AND WASHING MACHINE

CROSS REFERENCE TO RELATED APPLICATIONS

This is the U.S. national stage of application No. PCT/JP2014/079517, filed on Nov. 7, 2014. Priority under 35 U.S.C. § 119(a) and 35 U.S.C. § 365(b) is claimed from Japanese Application No. 2013-235965, filed Nov. 14, 2013, the disclosure of which is incorporated herein by reference.

FIELD OF THE INVENTION

At least an embodiment of the present invention relates to a clutch device structured to connect and disconnect transmission of a rotation drive force from a motor to a washing tub and to a washing machine on which the clutch device is mounted.

BACKGROUND

A washing machine including a clutch device on the way of a power transmission path for transmitting a rotation drive force of a motor to a washing tub is described in Patent Literature 1. In the clutch device described in Patent Literature 1, a clutch lever is moved up and down by a cam body turned by a drive motor and thereby the clutch device is switched between a state that a rotation drive force is transmitted and a state that the transmission of the rotation drive force is cut off in the clutch device. The cam body which is turned by the drive motor is provided with a contact-point cam structured to make a three-contact type switch on and off. Protrusions and recesses are formed on an outer peripheral face of the contact-point cam and an on/off state of contact points "a" and "b" of the three-contact type switch is switched every time the contact-point cam is turned by 180 degrees.

In the washing machine described in Patent Literature 1, connecting and disconnecting of a rotation drive force by the clutch device is switched by controlling driving of the drive motor based on OFF signals of the contact points "a" and "b" and washing and dewatering are performed. Further, the washing machine in Patent Literature 1 is structured so that a position of a valve body provided in a drainage valve of a washing tub is switched by the clutch device and drainage in the washing tub and rotation of the washing tub are performed by interlocking the common drive motor, the cam and the three-contact type switch with each other.

CITATION LIST

[PTL 1] Japanese Patent Laid-Open No. 2004-225734

In the washing machine described in Patent Literature 1, a switch element is provided in a circuit which connects the drive motor with a power supply and the switch element is controlled based on OFF signals of the contact points "a" and "b" to perform connecting and disconnecting of the clutch. Specifically, the contact points "a" and "b" are alternately set to be "off" states only for a short time each time the contact-point cam is turned by 180 degrees. The drive motor is stopped based on an OFF signal of the contact point "a" and thereby the clutch device is switched to a state that rotation is not transmitted to the washing tub and the valve body of the drainage valve is held at a closing position and washing is performed. Further, when the drive motor is stopped based on an OFF signal of the contact point "b", the clutch device is switched to a state that rotation is transmitted to the washing tub and the valve body of the drainage valve is held at an open position and dewatering is performed.

However, in the structure described in Patent Literature 1, in order to control power feeding to the drive motor of the clutch device, a microcomputer mounted on the washing machine is required to supply a control signal for the drive motor based on a signal from the three-contact type switch. Therefore, this structure is unable to cope with a system in which the drive motor of the clutch device is directly controlled by a switch which is mechanically set on and off interlocked with connecting and disconnecting states of the clutch device.

SUMMARY

In view of the problem described above, at least an embodiment of the present invention provides a highly versatile clutch device which can be used both in a structure that control of a motor for driving a clutch device is directly performed by a switch which is opened and closed interlocking with connecting and disconnecting states of the clutch device and a structure that control of the motor for driving the clutch device is performed through a signal from an external control circuit. Further, at least an embodiment of the present invention is to provide a washing machine which comprises the clutch device.

In order to attain the above, at least an embodiment of the present invention provides a clutch device structured to connect and disconnect transmission of a rotation drive force from a motor to a washing tub. The clutch device includes a first rotor body to which the rotation drive force of the motor is transmitted, a second rotor body which is engageable with the first rotor body, a clutch drive motor which is connected with a first drive line and a second drive line and is structured to be rotated by electric power supplied through the first drive line and the second drive line, a clutch mechanism which is driven by the clutch drive motor to perform switching between a connecting state where the rotation drive force is transmitted from the first rotor body to the second rotor body and a disconnecting state where the connecting state is released, a first switch which is switched from an "ON" state to an "OFF" state when switched from the connecting state to the disconnecting state, a second switch which is switched from an "ON" state to an "OFF" state when switched from the disconnecting state to the connecting state, a first terminal which is electrically connected with one of contact point electrodes of the first switch, a second terminal which is electrically connected with the first drive line, a third terminal which is electrically connected with one of contact point electrodes of the second switch, and a fourth terminal which is capable of electrically connecting with the second drive line. The other of the contact point electrodes of the first switch and the other of the contact point electrodes of the second switch are electrically connected with the second drive line.

In at least an embodiment of the present invention, a clutch mechanism is provided which is driven by a clutch drive motor, and two switches are provided which are mechanically opened and closed interlocked with connection and disconnection of the clutch mechanism, in other words, a first switch is provided which is switched from an "ON" state to an "OFF" state when the clutch mechanism is switched to a state where a drive force is transmitted, and a second switch is provided which is switched from an "ON" state to an "OFF" state when switched to a state where the drive force is not transmitted. Further, four terminals are provided, in other words, a first terminal connected with a contact point electrode of the first switch, a third terminal connected with a contact point electrode of the second switch, and a second and a fourth terminals connected with a first and a second drive lines for supplying electric power to the clutch drive motor. According to this structure, two switches are capable of being connected with a power feeding circuit for the clutch drive motor and thus the clutch drive motor can be directly driven and controlled depending on connecting and disconnecting states of the clutch mechanism. Further, signals from two switches can be outputted to an external control circuit and thus the clutch drive motor can be also driven and controlled by a control signal from the external control circuit. Therefore, various drive control systems can be utilized and its versatility is high.

In at least an embodiment of the present invention, it is desirable that the clutch mechanism includes a rotation member which is driven by the clutch drive motor, and a swing member which is structured to be reciprocatedly swung over a constant angular range based on rotation of the rotation member to move the second rotor body between a connecting position where the second rotor body is engaged with the first rotor body and a disconnecting position where engagement of the second rotor body with the first rotor body is released. The first rotor body and the second rotor body are coaxially disposed so as to be superposed on each other in an axial line direction of the washing tub, and the swing member is overlapped with the second rotor body in the axial line direction and is disposed so as to swing with a swing center line coincided with rotation center lines of the first rotor body and the second body as a center. The swing member is formed on one side in the axial line direction with a plurality of first cam faces of a cam mechanism structured to move the second rotor body in a direction approached to and separated from the first rotor body, and the plurality of the first cam faces is disposed with equal angular intervals with the swing center line as a center. In at least an embodiment of the present invention, as described above, the clutch drive motor can be driven depending on an actual state of the clutch mechanism by using the switches which are turned to an "OFF" state at a connecting position and a disconnecting position of the clutch mechanism. Therefore, the second rotor body can be accurately positioned at an engaging position with the first rotor body (clutch connecting position) and a position separated from the first rotor body (clutch disconnecting position). Accordingly, a required moving space of the second rotor body can be minimized and a dimension of the clutch device can be made small in a direction along the axial line direction of the washing tub. As a result, a washing machine in which a device dimension in the axial line direction of the washing tub is small can be realized. Further, cam faces of a cam mechanism for making the second rotor body approach to and separate from the first rotor body are disposed equally in a circumferential direction with a rotation center line of the second rotor body as a center and thus the swing member and the second rotor body can be moved in the axial line direction without being inclined. Therefore, connection and disconnection of the clutch mechanism can be performed with a high degree of accuracy.

In at least an embodiment of the present invention, it is desirable that the swing member is structured so that the swing member is reciprocatedly swung over the constant angular range by being moved by an eccentric pin provided in the rotation member and thereby the swing member is moved in the axial line direction between the connecting position and the disconnecting position, the eccentric pin is passed through a first rotation position and a second rotation position in tangential directions parallel to an imaginary line which is formed by connecting a rotation center of the rotation member and a swing center of the swing member and, when the eccentric pin is passed one of the first rotation position and the second rotation position, the swing member is moved to the connecting position and, when passing the other, the swing member is moved to the disconnecting position. According to this structure, a moving amount (swing angle) of the swing member for a turning angle of the rotation member is small at the connecting position, the disconnecting position and the vicinities of the positions of the clutch mechanism. Therefore, the clutch mechanism can be driven and controlled with a high degree of accuracy at the connecting position, the disconnecting position and the vicinities of the positions of the clutch mechanism and the clutch drive motor can be surely stopped at the connecting position and the disconnecting position of the clutch mechanism.

In this case, it is desirable that the clutch mechanism includes a second cam face facing the first cam face, and the second cam face is formed with a connecting position holding cam face which is extended in a circumferential direction so that its normal direction is directed in a direction parallel to the axial line and which holds the second rotor body at the connecting position, and a disconnecting position holding cam face which is extended in the circumferential direction so that its normal direction is directed in a direction parallel to the axial line and which holds the second rotor body at the disconnecting position. According to this structure, the second rotor body can be held in a state that the second rotor body is not moved in a connecting and disconnecting direction of the clutch mechanism by the connecting position holding cam face and the disconnecting position holding cam face. Therefore, even when rattling is occurred in the clutch mechanism or in the members of the first and the second switches, the clutch device can be set in the connected and the disconnected states.

In at least an embodiment of the present invention, it is desirable that the clutch device includes a rotation cam which is rotationally driven by the clutch drive motor, a first movable plate which structures one of one contact point electrode and the other contact point electrode of the first switch and which contacts with a cam face of the rotation cam in an urged state toward the cam face, and a second movable plate which structures one of one contact point electrode and the other contact point electrode of the second switch and which contacts with the cam face in an urged state toward the cam face, and a first inclined face of the cam face for moving the first movable plate and the second movable plate from an "ON" position to an "OFF" position is steeper in inclination than a second inclined face for moving the first movable plate and the second movable plate from the "OFF" position to the "ON" position. According to this structure, when the switch is turned to an "OFF" state, the contact point electrode is rapidly separated and thus the contact point electrode can be suppressed from being an unstable contact state. Therefore, chattering of a power supply for the clutch drive motor can be suppressed.

Next, a washing machine in accordance with at least an embodiment of the present invention includes the above-mentioned clutch device, a washing tub which is integrally rotated with the second rotor body, and a pulsator which is integrally rotated with the first rotor body in an inside of the washing tub.

The washing machine in accordance with at least an embodiment of the present invention includes a first power feeding circuit which supplies electric power to the clutch drive motor through the first terminal and the second terminal when the first switch is set in an "ON" state, and a second power feeding circuit which supplies electric power to the clutch drive motor through the second terminal and the third terminal when the second switch is set in an "ON" state. According to this structure, the clutch drive motor can be directly driven and controlled depending on the connecting and disconnecting state of the clutch mechanism.

Alternatively, a washing machine in accordance with at least an embodiment of the present invention includes a power feeding circuit which supplies electric power to the clutch drive motor through the second terminal and the fourth terminal, and a control section which controls supply of electric power from the power feeding circuit based on an electric potential of the first terminal and an electric potential of the second terminal. According to this structure, the clutch drive motor can be driven and controlled by a control signal from the control section.

According to the clutch device in accordance with at least an embodiment of the present invention, four terminals are provided, in other words, the second and the fourth terminals connected with a first and a second drive lines for supplying electric power to the clutch drive motor and the first and the third terminals connected with contact point electrodes of two switches which are mechanically opened and closed interlocked with connection and disconnection of the clutch mechanism are provided. Therefore, two switches are capable of being connected with a power feeding circuit for the clutch drive motor and thus the clutch drive motor can be directly driven and controlled depending on a connecting and disconnecting state of the clutch mechanism. Further, signals from two switches can be outputted to an external control circuit and thus the clutch drive motor can be driven and controlled by a control signal from the external control circuit. Therefore, various drive control systems can be utilized and its versatility is high.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings. In the following descriptions, a structure of a clutch device will be easily understood when it is described in a state that the clutch device mounted on a washing machine is viewed from a lower side. Therefore, in the following descriptions, a rotating direction is shown, for convenience, in a "clockwise direction CW" and a "counterclockwise direction CCW" viewed from a lower side in a state that the clutch device is mounted on a washing machine.

(Entire Structure)

Figure 1:
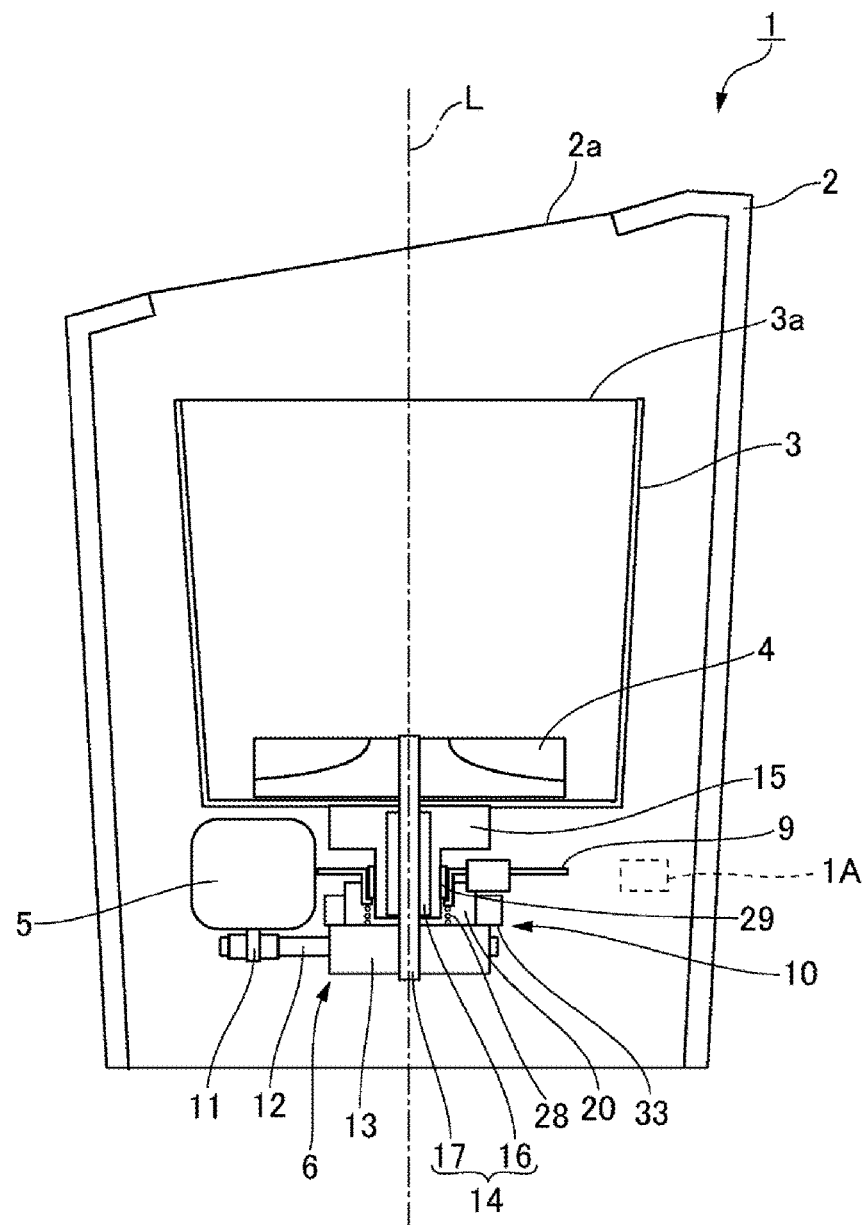
FIG. 1 is a longitudinal sectional view showing a schematic structure of a washing machine in accordance with an embodiment of the present invention.

FIG. 1 is a longitudinal sectional view showing a schematic structure of a washing machine in accordance with an embodiment of the present invention. As shown in FIG. 1, a washing machine 1 includes a main body frame 2. The main body frame 2 is provided with an opening part 2a for putting in and taking out laundry such as clothes on its upper face. The main body frame 2 is formed in a rectangular tube shape and its under face is opened. A washing tub 3 formed in a bottomed tube shape is accommodated in an inside of the main body frame 2 so that its opening part 3a is directed toward an upper side. The washing tub 3 is hanged by the main body frame 2 through a buffer member not shown and is held in a rotatable state around an axial line "L". A pulsator 4 is disposed in a bottom portion on an inner side of the washing tub 3.

A motor 5 is disposed to a lower side of the washing tub 3. A rotation drive force of the motor 5 is transmitted to the washing tub 3 and the pulsator 4 through a drive force transmission mechanism 6. The drive force transmission mechanism 6 includes a clutch device 10 structured to connect and disconnect transmission of a rotation drive force of the motor 5 to the washing tub 3 on the way of a power transmission path from the motor 5 to the washing tub 3.

When the washing machine 1 is operated in a state that clothes have been put into the washing tub 3 through the opening part 2a of the main body frame 2, washing water is supplied to the washing tub 3 through a water supply pipe not shown. After that, the motor 5 is driven to rotate the pulsator 4 and washing of clothes in the washing tub 3 is performed. In a washing operation when clothes are washed, the clutch device 10 is set in a disconnecting state that transmission of a rotation drive force of the motor 5 to the washing tub 3 is disconnected. Therefore, the washing tub 3 is set in a stopped state.

When washing operation is finished and washing water is drained from the washing tub 3, a dewatering operation for dewatering clothes is performed. In the dewatering operation, the clutch device 10 is set in a connecting state that a rotation drive force of the motor 5 is transmitted to the washing tub 3 and, in this state, the motor 5 is driven. As a result, the pulsator 4 and the washing tub 3 are integrally rotated and thus the clothes in the washing tub 3 are also turned together with the washing tub 3 and the pulsator 4. Therefore, the clothes are dewatered by a centrifugal force.

(Drive Force Transmission Mechanism)

Figure 2:
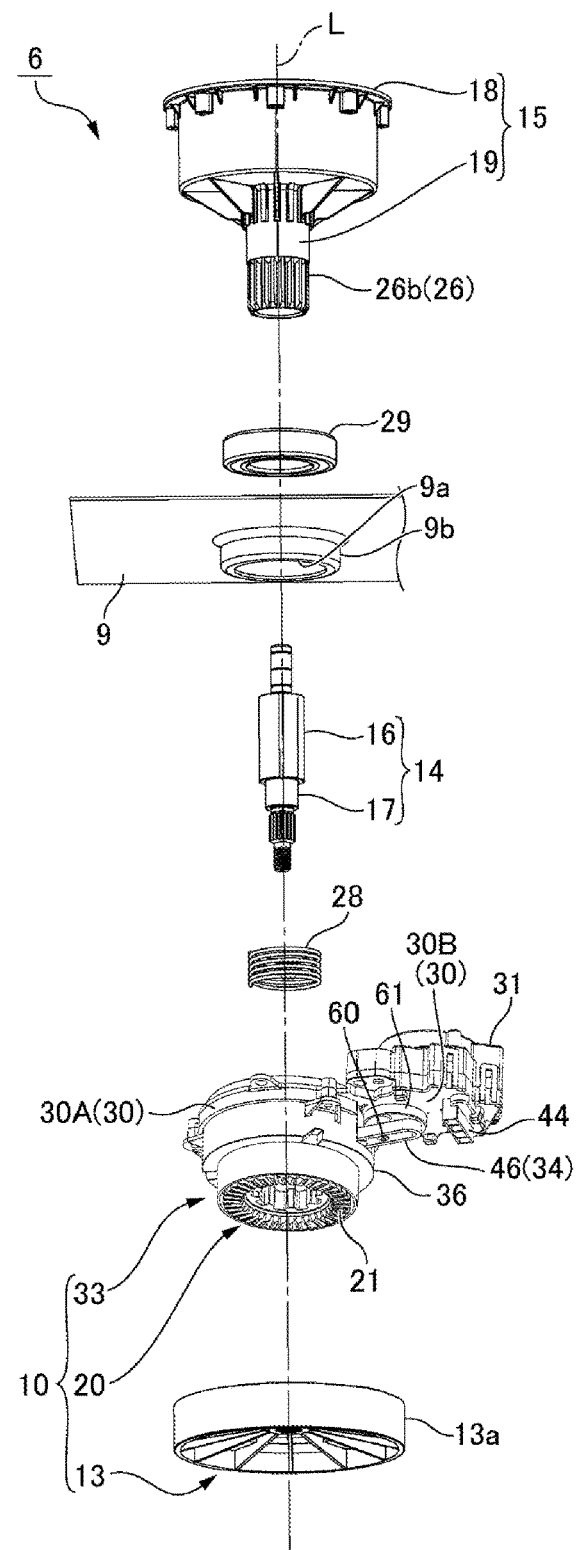
FIG. 2 is an exploded perspective view showing a main part of a drive force transmission mechanism.
Figure 3:
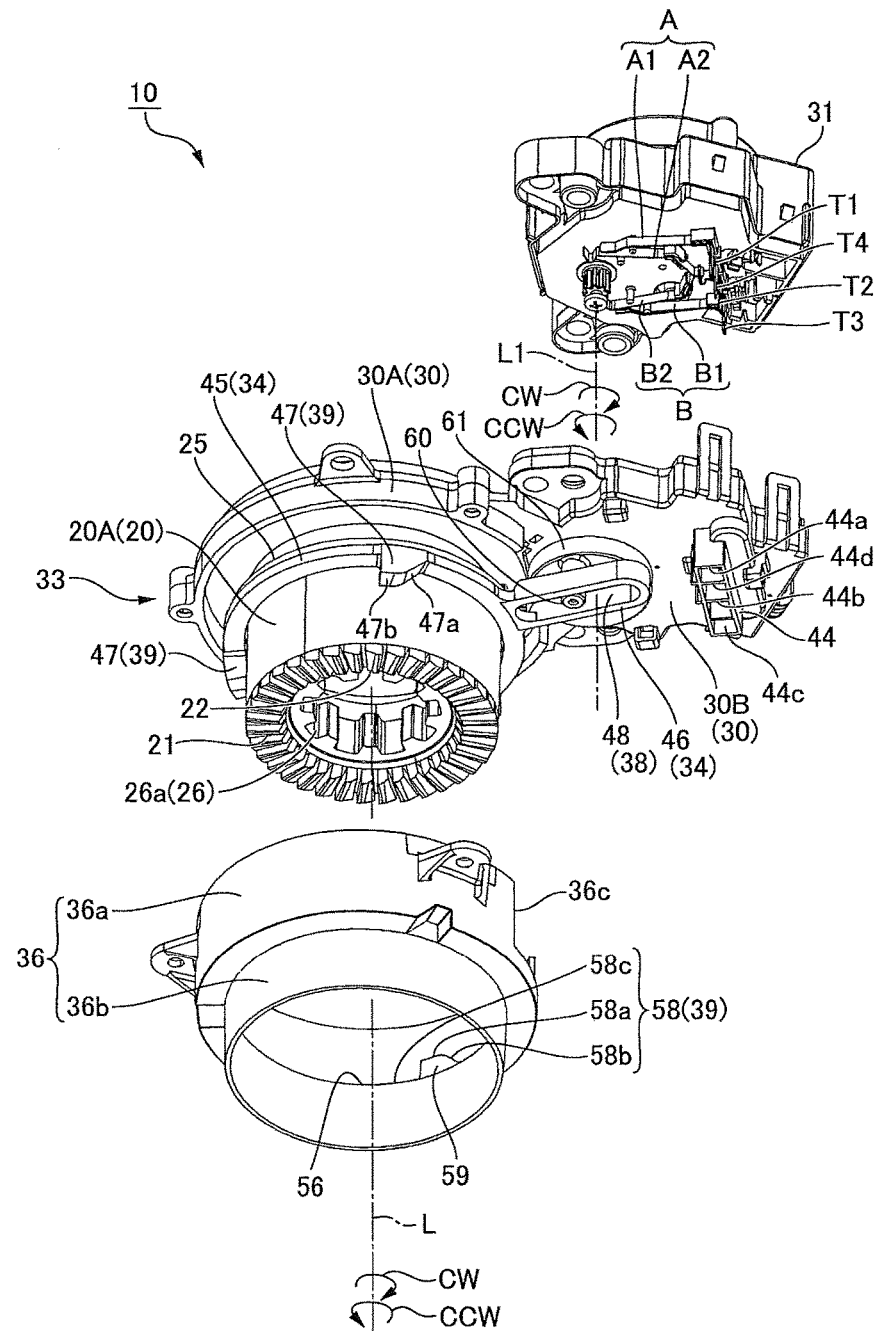
FIG. 3 is an exploded perspective view showing a clutch device which is viewed from an oblique lower side.
Figure 4:
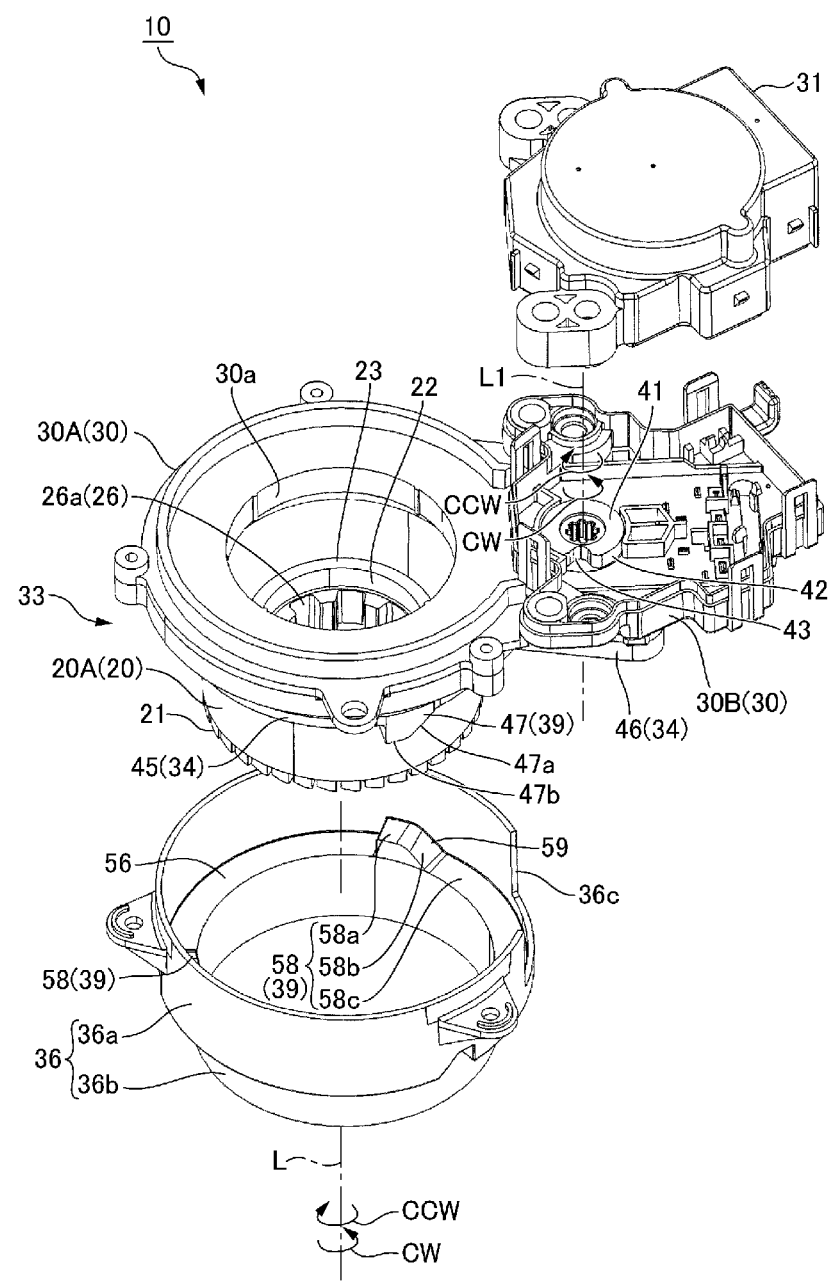
FIG. 4 is an exploded perspective view showing a clutch device which is viewed from an obliquely upper side.

FIG. 2 is an exploded perspective view showing a main part of the drive force transmission mechanism 6. Further, FIGS. 3 and 4 are exploded perspective views showing the clutch device 10 in which a first rotor body is not shown. FIG. 3 is an exploded perspective view when viewed from an obliquely lower side (first rotor body 13 side) and FIG. 4 is an exploded perspective view when viewed from an obliquely upper side (connection member 15 side). As shown in FIGS. 1 and 2, the drive force transmission mechanism 6 includes the clutch device 10, a shaft member 14 coaxially disposed with the first rotor body 13 and a second rotor body 20 of the clutch device 10, and a connection member 15 coaxially connected with a lower end portion of the washing tub 3.

The clutch device 10 includes the first rotor body 13 to which a rotation drive force of an output shaft 11 of the motor 5 is transmitted through an endless belt 12 (see FIG. 1) and the second rotor body 20 which is disposed so as to be superposed on the first rotor body 13 in an axial line "L" direction of the washing tub 3. The first rotor body 13 is formed in a disk shape and is coaxially disposed with the washing tub 3 to a lower side of the washing tub 3. A circular outer peripheral face of the first rotor body 13 is an attaching face 13a to which the endless belt 12 is attached. Further, a center portion of an upper end face of the first rotor body 13 is formed with a teeth part not shown. The teeth part faces a teeth part 21 provided on a lower end face of a lower side portion 20A (see FIG. 3) of the second rotor body 20 and is formed in a shape so as to be engaged with the teeth part 21. Each of the teeth part of the first rotor body 13 and the teeth part 21 of the second rotor body 20 is formed in a shape so that a plurality of projections extended in a radial direction is arranged with equal angular intervals in a circular ring shape.

The shaft member 14 includes an outer shaft member 16 formed in a tube shape and a rotation shaft 17 which is disposed on an inner side of the outer shaft member 16. A lower end portion of the rotation shaft 17 is, as shown in FIG. 1, connected with the first rotor body 13, and its upper end portion is penetrated through a bottom part of the washing tub 3 and connected with the pulsator 4. Therefore, a rotation drive force of the motor 5 is transmitted to the pulsator 4 through the endless belt 12, the first rotor body 13 and the rotation shaft 17. In other words, a power transmission path including the endless belt 12, the first rotor body 13 and the rotation shaft 17 is structured between the motor 5 and the pulsator 4.

In this embodiment, the outer shaft member 16 is relatively rotatable to the rotation shaft 17 and the outer shaft member 16 and the first rotor body 13 are not connected with each other. On the other hand, a connection member 15 is attached to an outer peripheral side of the outer shaft member 16 and the outer shaft member 16 and the connection member 15 are integrally rotated with each other.

The connection member 15 is, as shown in FIG. 2, provided with a large diameter flange part 18 connected with the washing tub 3 and a small diameter tube part 19 whose diameter is smaller than that of the large diameter flange part 18. The small diameter tube part 19 is protruded to a lower side from the large diameter flange part 18. The shaft member 14 is inserted into an inner side of the small diameter tube part 19. The outer shaft member 16 of the shaft member 14 is connected with the small diameter tube part 19 so as to rotate together with the connection member 15. The second rotor body 20 is coaxially attached to an outer peripheral side of a lower side portion of the small diameter tube part 19.

A lower side portion 20A of the second rotor body 20 is formed with a penetration part 22 to which a lower side portion of the small diameter tube part 19 is attached. An inner peripheral face of the penetration part 22 is formed with a plurality of longitudinal grooves 26a and an outer peripheral face of the small diameter tube part 19 is formed with a plurality of projections 26b. The second rotor body 20 is connected with the connection member 15 in a state relatively movable in the axial line "L" direction with respect to the connection member 15 and in a state integrally rotatable with the connection member 15 by a spline 26 structured of the longitudinal grooves 26a and the projections 26b. In other words, the second rotor body 20 is integrally and rotatably connected with the washing tub 3 through the connection member 15.

When the second rotor body 20 is moved to a lower side (first rotor body 13 side) along the axial line "L" of the washing tub 3, the teeth part 21 and the teeth part of the first rotor body 13 side are engaged with each other. When the second rotor body 20 and the first rotor body 13 are engaged with each other, the second rotor body 20 is integrally rotated with the first rotor body 13 in a coaxial state. As a result, a rotation drive force of the motor 5 is transmitted to the washing tub 3 through the endless belt 12, the first rotor body 13, the second rotor body 20 and the connection member 15. In other words, a power transmission path having the endless belt 12, the first rotor body 13, the second rotor body 20 and the connection member 15 is provided between the motor 5 and the washing tub 3.

The clutch device 10 includes a main frame 30 attached from an under face side to a support plate 9 which is disposed at a predetermined position to a lower side of the washing tub 3. The support plate 9 is hanged from the main body frame 2 together with the washing tub 3 through a buffer member not shown. The clutch device 10 is supported by the main body frame 2 through the support plate 9.

As shown in FIG. 2, the support plate 9 is provided with a ring-shaped protruded part 9b which is protruded to a lower side. A center portion of the ring-shaped protruded part 9b is provided with a through-hole 9a through which the small diameter tube part 19 of the connection member 15 is penetrated in the axial line "L" direction. The ring-shaped protruded part 9b is penetrated through a through-hole 30a (see FIG. 4) provided in a rotor body mounting part 30A of a main frame 30 of the clutch device 10 and is protruded to a lower side. A lower end portion of the ring-shaped protruded part 9b is inserted into an inner side of an upper side portion of the second rotor body 20. Further, the main frame 30 is provided with a mechanism mounting part 30B which is protruded to an outer side in a radial direction from the rotor body mounting part 30A. A motor case 31 is fixed to the mechanism mounting part 30B. The motor case 31 structures a motor accommodation part which accommodates a synchronous motor 37 (clutch drive motor) described below and a gear train 63 (see FIGS. 7A and 7B).

As shown in FIG. 1, a compression coil spring 28 is provided on a lower side of a lower end face of the ring-shaped protruded part 9b. The compression coil spring 28 is disposed between a lower end face of the ring-shaped protruded part 9b and an upward face 23 (see FIG. 4) which is formed on an inner side of an upper side portion of the second rotor body 20. The compression coil spring 28 urges the second rotor body 20 to a lower side (direction toward the first rotor body 13). In addition, a ring-shaped bearing 29 is disposed on an inner side of the ring-shaped protruded part 9b of the support plate 9. The washing tub 3 is rotatably supported through the connection member 15 by using the bearing 29.

(Clutch Device)

Figure 5A:
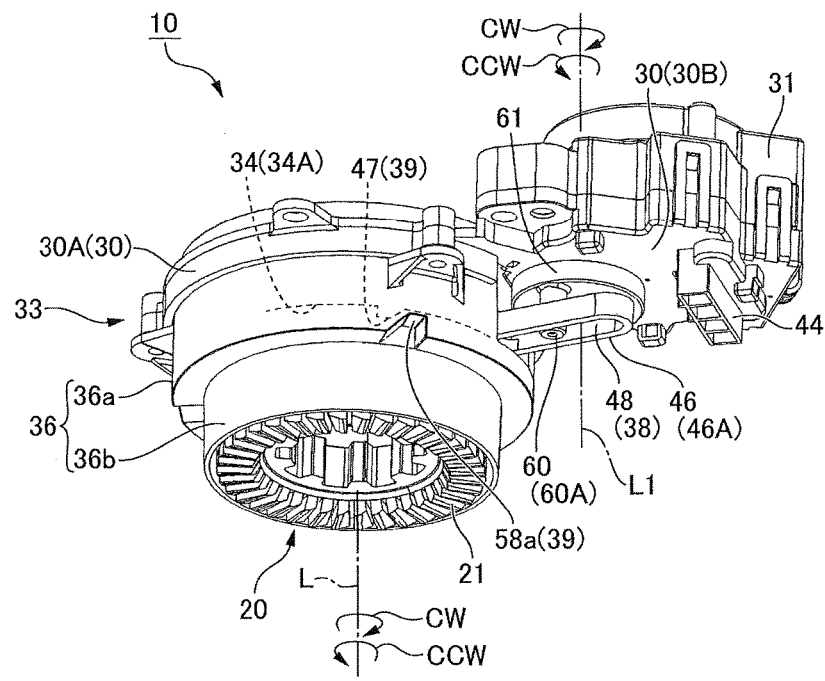
FIGS. 5A and 5B are perspective views showing connecting and disconnecting states of a clutch device.
Figure 5B:
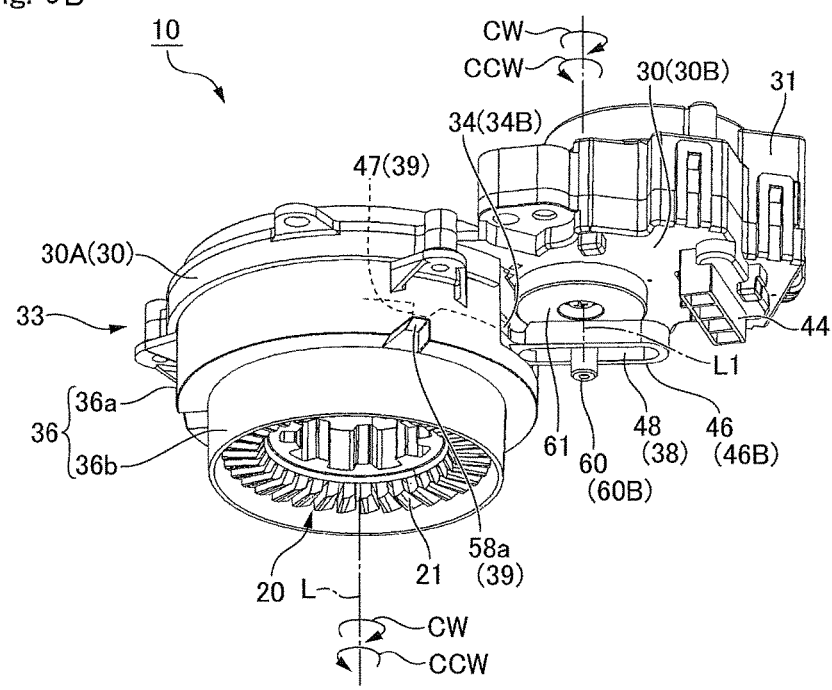
Figure 6A:
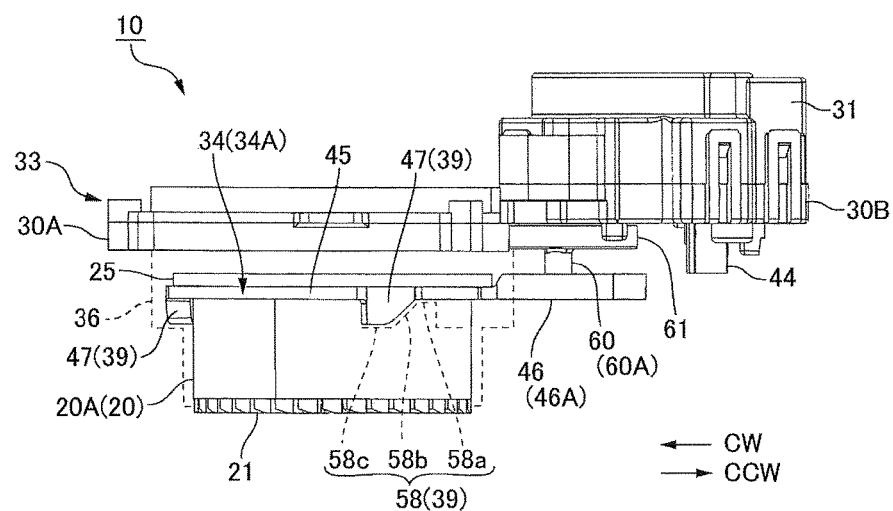
FIGS. 6A and 6B are side views showing connecting and disconnecting states of a clutch device.
Figure 6B:
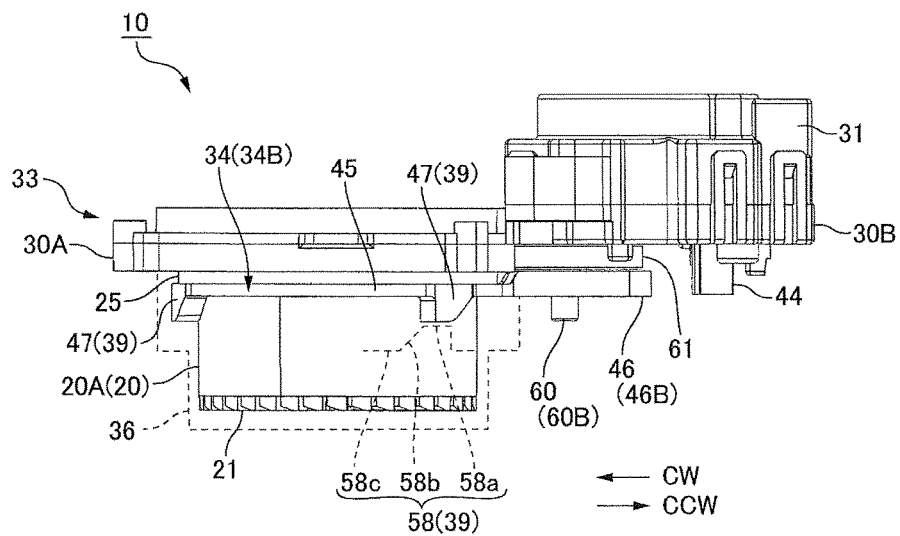

Next, the clutch device 10 will be described below with reference to FIG. 3 through FIG. 8. FIGS. 5A and 5B are perspective views showing connecting and disconnecting states of the clutch device 10. FIGS. 6A and 6B are side views showing connecting and disconnecting states of the clutch device 10. FIGS. 5A and 6A are views showing connecting states in which a drive force of the motor 5 is transmitted. FIGS. 5B and 6B are views showing disconnecting states in which a drive force of the motor 5 is not transmitted. Further, in FIGS. 5A and 5B and FIGS. 6A and 6B, the first rotor body 13 is not shown and, in FIGS. 6A and 6B, a cover frame is shown by the broken line The clutch device 10 includes the first rotor body 13 and the second rotor body 20 described above, a clutch mechanism 33, and a synchronous motor 37 (clutch drive motor) structured to drive the clutch mechanism 33. The clutch mechanism 33 is switched between a connecting state in which a rotation drive force is transmitted from the first rotor body 13 to the second rotor body 20 and a disconnecting state in which the connecting state is released. The clutch mechanism 33 moves the second rotor body 20 in the axial line "L" direction when a connecting state and a disconnecting state are to be switched. Further, the clutch device 10 includes a first switch "A" which is switched from an "ON" state to an "OFF" state when the clutch mechanism 33 is switched from the connecting state to the disconnecting state, a second switch "B" which is switched from an "ON" state to an "OFF" state when the clutch mechanism 33 is switched from the disconnecting state to the connecting state, and a terminal part 44 in which terminals connected with contact points of the first switch "A" and the second switch "B" are disposed. The terminal part 44 is formed in the mechanism mounting part 30B of the main frame 30.

The clutch mechanism 33 includes a swing member 34 which rotatably supports the second rotor body 20, a cover frame 36 which supports the swing member 34 in a state movable in the axial line "L" direction and in a reciprocatedly swingable state around the axial line "L", and a rotation member 61 which is turned by a synchronous motor 37 in one direction. Further, the clutch mechanism 33 includes a conversion mechanism 38 (rotation—swing conversion mechanism) by which rotation in one direction (clockwise direction CW around the rotation center shaft "L1") of the rotation member 61 is converted to a reciprocating swing of the swing member 34 (reciprocating swing in a clockwise direction CW and a counterclockwise direction CCW around the axial line "L"), and a cam mechanism 39 which reciprocatedly moves the swing member 34 in the axial line "L" direction interlocked with the reciprocating swing of the swing member 34.

The swing member 34 is, as shown in FIGS. 3 and 4, provided with a ring-shaped part 45 and a lever part 46 which is protruded to an outer peripheral side from the ring-shaped part 45. A lower side portion 20A of the second rotor body 20 is inserted to an inner side of the ring-shaped part 45, and a flange 25 formed on an outer peripheral face of an upper end of the lower side portion 20A is contacted with the swing member 34 in a state that the flange 25 is placed on an upper face of the ring-shaped part 45. A first cam part 47 structuring a cam mechanism 39 is provided on an under face of the ring-shaped part 45 at three positions separated from each other with equal angular intervals. Each of the first cam parts 47 is a protruded part which is protruded toward a lower side and is provided with an inclined face 47a, which is inclined to a lower side as going to one side in a circumferential direction, and a flat lower end face 47b which is extended from a lower end of the inclined face 47a in a direction perpendicular to the axial line "L". The inclined face 47a and the lower end face 47b structure a first cam face of the cam mechanism 39. The lever part 46 is formed with an elongated hole 48 structuring the conversion mechanism 38. The elongated hole 48 is a straight-shaped elongated hole and is extended long in a protruding direction of the lever part 46 (direction away from the center of the axial line "L").

The cover frame 36 is formed in a shape in which a large diameter part 36a and a small diameter part 36b in cylindrical shapes are connected with each other in an upper and lower direction. The cover frame 36 is fixed to a lower side of the rotor body mounting part 30A of the main frame 30 coaxially with the through-hole 30a with the axial line "L" as a center. The cover frame 36 covers the lower side portion 20A of the second rotor body 20 and the ring-shaped part 45 of the swing member 34 from an outer peripheral side. As shown in FIG. 4, an inner face of the cover frame 36 is formed with a step face 56 facing upward at a connection part of the large diameter part 36a with the small diameter part 36b. The step face 56 is a circular ring-shaped face with the axial line "L" as a center and the ring-shaped part 45 of the swing member 34 is disposed above the step face 56.

The large diameter part 36a of the cover frame 36 is formed with a cut-out part 36c which is formed by cutting out its portion in a circumferential direction from an upper side. The swing member 34 is placed on the step face 56 from an upper side in a state that the lever part 46 is protruded from the cut-out part 36c toward the mechanism mounting part 30B. The step face 56 is formed with a second cam face 58 at three positions with equal angular intervals so as to be capable of sliding on the first cam face (the inclined face 47a and the lower end face 47b) of the first cam part 47 provided in the swing member 34. The second cam face 58 is provided with a first cam face portion 58a in a flat face, which is an upper end face of the second cam part 59 that is a protruded part protruding to an upper side from an upper face of the step face 56, a second cam face portion 58b in an inclined face, which is a side face on one side in the circumferential direction of the second cam part 59, and a third cam face portion 58c in a flat face which is an upper face of the step face 56 and is extended from a lower end of the second cam face portion 58b.

The cam mechanism 39 is structured of the first cam face (the inclined face 47a and the lower end face 47b) which is an end face of the first cam part 47 formed in the swing member 34 and the second cam face 58 which is an end face of the second cam part 59 formed in the cover frame 36. The inclined face 47a of the first cam face and the second cam face portion 58b of the second cam face 58 are inclined to a lower side as going to one side in the circumferential direction (clockwise direction CW with the axial line "L" as a center). Further, in the second cam face 58, the first cam face portion 58a and the third cam face portion 58c are formed in flat faces which are extended in the circumferential direction so that their normal directions are directed to a parallel direction to the axial line "L". In accordance with an embodiment of the present invention, the cam mechanism 39 is not limited to a cam mechanism utilizing an end face shape of a cylindrical tube member as described above, but various well-known cam shapes may be used.

The conversion mechanism 38 includes the elongated hole 48 as an engaging part which is provided in the lever part 46 of the swing member 34 and the rotation member 61 which is connected with an output shaft of the synchronous motor 37 through a gear train 63. The rotation member 61 is formed with an eccentric pin 60 in a column shape which is engaged with the elongated hole 48 in a state slidable in the elongated hole 48. The rotation member 61 is rotatably attached at a position on the rotor body mounting part 30A side in the mechanism mounting part 30B of the main frame 30 so as to be rotatable around the rotation center axis "L1" which is parallel to the axial line "L".

Figure 7A:
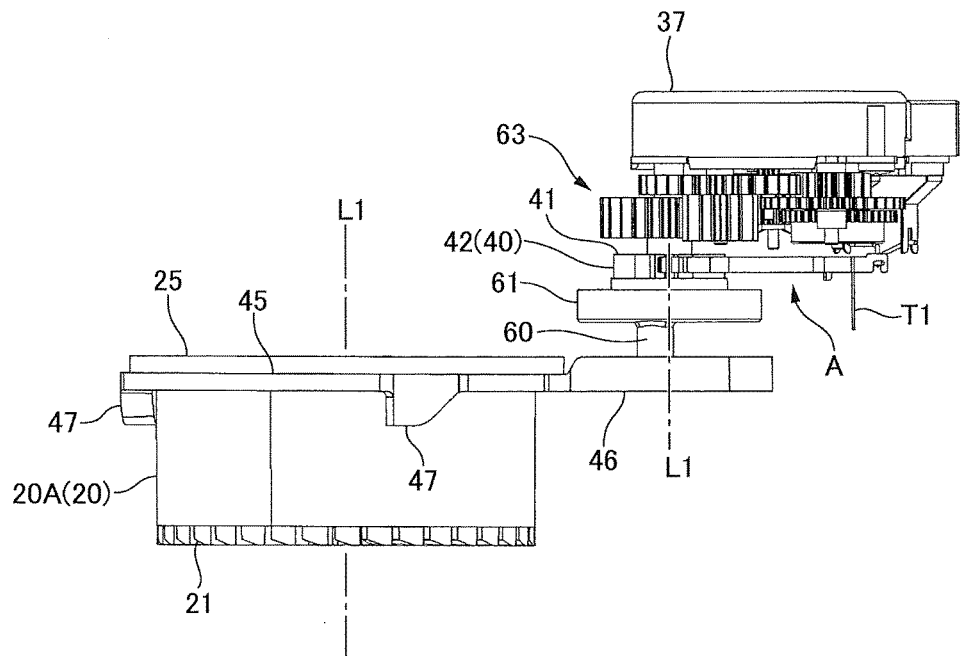
FIGS. 7A and 7B are explanatory views showing a clutch device from which a main frame, a motor case and a cover frame are detached.
Figure 7B:
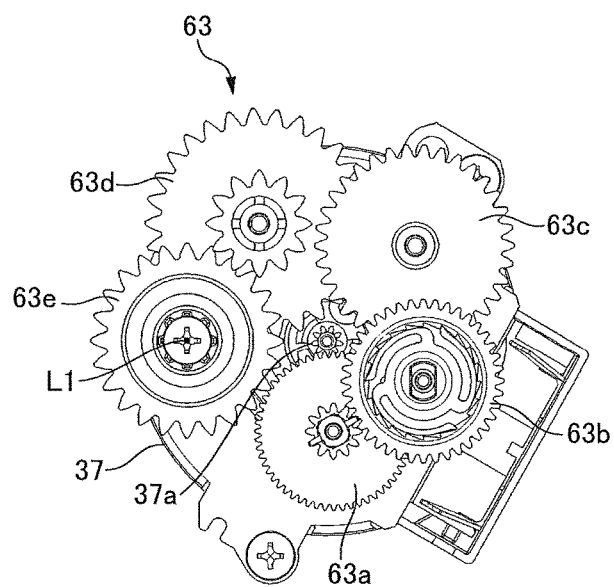

FIG. 7A is a side view showing the clutch device 10 from which the main frame 30, the motor case 31 and the cover frame 36 are detached. FIG. 7B is a plan view showing a synchronous motor and a gear train of the clutch device 10 which are viewed from a lower side. A rotation drive force of the synchronous motor 37 disposed in an inside of the motor case 31 is transmitted to the rotation member 61 through a gear train 63 which is disposed in the inside of the motor case 31 together with the synchronous motor 37. The synchronous motor 37 in this embodiment is an AC synchronous motor and its rotating direction is restricted in one direction.

As shown in FIG. 7B, a pinion 37a is attached to an output shaft of the synchronous motor 37. The gear train 63 includes a first gear 63a having a large diameter gear part engaged with the pinion 37a, a second gear 63b having a large diameter gear part engaged with a small diameter gear part of the first gear 63a, a third gear 63c having a large diameter gear part engaged with a small diameter gear part of the second gear 63b, a fourth gear 63d having a large diameter gear part engaged with a small diameter gear part of the third gear 63c, and a fifth gear 63e engaged with a small diameter gear part of the fourth gear 63d. The fifth gear 63e is attached so as to integrally rotate with the rotation member 61 and a rotation cam 41 described below.

When the synchronous motor 37 is driven, a rotation drive force is transmitted to the rotation member 61 through the gear train 63 and the rotation member 61 is turned in one direction (clockwise direction CW with the rotation center axis "L1" as a center). As a result, the eccentric pin 60 is moved in the one direction (clockwise direction CW with the rotation center axis "L1" as a center) along a circular orbit around the rotation center axis "L1". While moving along the circular orbit, the eccentric pin 60 slides in the inside of the elongated hole 48 to swing the lever part 46 of the swing member 34 over a predetermined angular range. In this case, the swing member 34 is, as a whole, swung with a swing center line as a center which is coincided with the rotation center lines of the first rotor body 13 and the second rotor body 20 (in other words, a straight line coincided with the axial line "L").

As shown in FIG. 5B, when the lever part 46 is moved to the second position 46B at one end in the reciprocating swing range, as shown in FIG. 5B and FIG. 6B, the first cam part 47 of the swing member 34 becomes to run on the first cam face portion 58a of the step face 56. Therefore, the swing member 34 is moved upward in the axial line "L" direction to be set in a state moved to a disconnecting position 34B. As a result, the second rotor body 20 supported by the swing member 34 is moved to an upper side in the axial line "L" direction against an urging force of the compression coil spring 28 and is separated from the first rotor body 13. In other words, when the lever part 46 is moved to the second position 46B at one end in the reciprocating swing range, engagement of the second rotor body 20 with the first rotor body 13 is released. In this manner, the clutch device 10 is set to be a disconnecting state in which a rotation drive force of the motor 5 is not transmitted to the washing tub 3.

On the other hand, as shown in FIG. 5A, when the lever part 46 of the swing member 34 is moved to the first position 46A at the other end in the reciprocating swing range, the first cam part 47 of the swing member 34 is slid down the second cam face portion 58b of the second cam face 58 and is placed on the third cam face portion 58c. In this case, the swing member 34 is moved down from the disconnecting position 34B in the axial line "L" direction and is set in a state moved to a connecting position 34A. When the swing member 34 is moved to the connecting position 34A, the teeth part 21 of the second rotor body 20 supported by the swing member 34 is engaged with the teeth part of the first rotor body 13 to be a state that the second rotor body 20 and the first rotor body 13 are capable of being integrally rotated with each other. As a result, the clutch device 10 is set to be a connecting state in which a rotation drive force of the motor 5 is transmitted to the washing tub 3.

In the clutch device 10, the cam mechanism 39 for moving the swing member 34 in the axial line "L" direction is provided with three first cam parts 47 formed on the swing member 34. The first cam parts 47 are disposed on the swing member 34 with equal angular intervals with the axial line "L" which is its swing center line as a center. In other words, in the respective first cam parts 47, the first cam face (inclined face 47a and lower end face 47b) which is slidably moved on the second cam face 58 of the cover frame 36 is disposed with equal angular intervals with the axial line "L" as a center. Therefore, in a disconnecting and connecting operation of the clutch device 10, the swing member 34 is moved in a direction parallel to the axial line "L", and the swing member 34 is moved without being inclined with respect to the rotation center lines (axial line "L") of the first rotor body 13 and the second rotor body 20. Accordingly, the second rotor body 20 supported by the swing member 34 can be moved without being inclined with respect to its rotation center line.

In this embodiment, the second cam face 58 is formed so that the first cam part 47 of the swing member 34 is run on the first cam face portion 58a (disconnecting position holding cam face) at a predetermined position before the lever part 46 is reached to the first position 46A at one end in the reciprocating swing direction. Then, the first cam part 47 moves on the flat first cam face portion 58a until reaching to the first position 46A. Similarly, the second cam face 58 is formed so that the first cam part 47 of the swing member 34 is transferred to the third cam face portion 58c (connecting position holding cam face) at a predetermined position before the lever part 46 is reached to the second position 46B at the other end in the reciprocating swing direction. Then, the first cam part 47 is moved on the flat third cam face portion 58c until reaching to the second position 46B.

As described above, the flat faces extended in the circumferential direction whose normal directions are set in directions parallel to the axial line "L" are provided at one end and the other end in the reciprocating swing direction of the second cam face 58. Therefore, the vicinities of the one end and the other end in the reciprocating swing range of the lever part 46 are formed as regions where the second rotor body 20 is not moved in the axial line "L" direction which is a connecting and disconnecting direction of the clutch device. When these regions are provided, even in a case that timing of a drive signal to the synchronous motor 37 is deviated or the like due to rattling of structural members of the clutch device 10 such as the swing member 34 and the cover frame 36, or due to rattling of the structural members of the first switch "A" and the second switch "B", which causes lowering of drive accuracy of the swing member 34, the clutch device 10 can be set in a connecting state and a disconnecting state surely.

Figure 8:
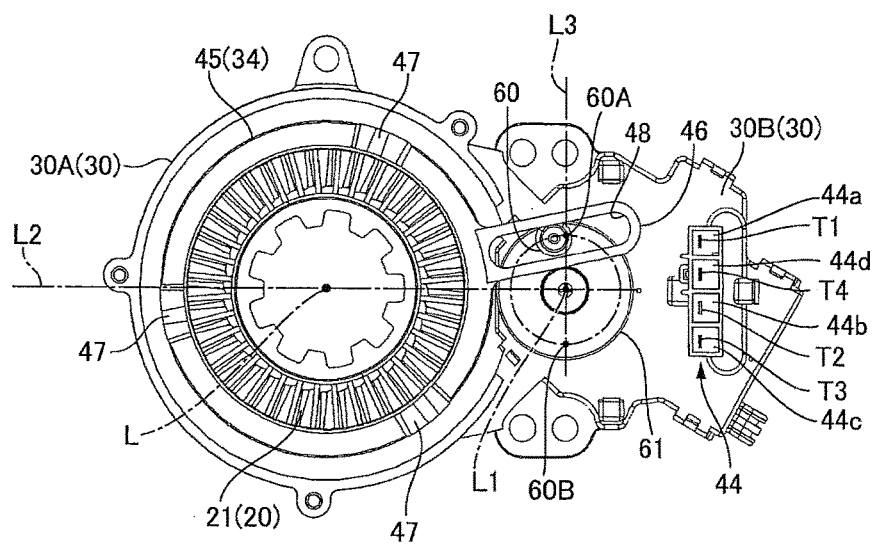
FIG. 8 is a plan view showing a clutch device from which a cover frame is detached and which is viewed from a lower side.

FIG. 8 is a plan view showing the clutch device 10 from which the first rotor body 13 and the cover frame 36 are detached and which is viewed from a lower side. When the synchronous motor 37 is rotated in one direction, the eccentric pin 60 is turned so as to pass a first rotation position 60A and a second rotation position 60B which are located on an imaginary line "L3" that is perpendicular to an imaginary line "L2" passing the swing center (axial line "L") of the swing member 34 and a rotation center (rotation center axis "L1") of the rotation member 61 and that passes the rotation center of the rotation member 61. When the eccentric pin 60 is moved to the first rotation position 60A, the lever part 46 of the swing member 34 is moved to the first position 46A which is one end in the reciprocating swing range and, when the eccentric pin 60 is moved to the second rotation position 60B, the lever part 46 is moved to the second position 46B which is the other end in the reciprocating swing range.

The first rotation position 60A and the second rotation position 60B are located on a circular orbit and thus tangential directions at the first rotation position 60A and the second rotation position 60B are parallel to the imaginary line "L2" formed by connecting the swing center of the swing member 34 with the rotation center of the rotation member 61. This means that, in the first rotation position 60A and the second rotation position 60B, a moving amount (swing angle) of the lever part 46 with respect to a turning angle of the eccentric pin 60 is the smallest and, in the first position 46A at the one end and the second position 46B at the other end in the reciprocating swing range of the lever part 46, swing of the lever part 46 can be controlled with a high degree of accuracy and a moving amount in the axial line "L" direction of the swing member 34 can be controlled finely. In other words, the conversion mechanism 38 is structured so that, while the eccentric pin 60 is turned at a constant speed, a moving amount in the axial line "L" direction of the swing member 34 can be controlled finely at the one end and the other end in the reciprocating swing range. Therefore, the second rotor body 20 can be stopped with a high degree of accuracy at both positions, i.e., at a clutch connecting position engaged with the first rotor body 13 and at a clutch disconnecting position disengaged from the first rotor body 13.

(Switch)

As shown in FIGS. 3 and 4, the first switch "A" and the second switch "B" and the rotation cam 41 structured to switch on and off states of the first switch "A" and the second switch "B" interlocked with the reciprocating swing of the swing member 34 are mounted between the mechanism mounting part 30B of the main frame 30 and the motor case 31. The rotation cam 41 is integrally rotated with the rotation member 61 which is rotated by the synchronous motor 37. The rotation cam 41 is formed in a disk shape in which a part in a circumferential direction is recessed to an inner side in a radial direction and a cam face 42 is provided on its outer peripheral face. A part of the cam face 42 is formed to be a recessed part 43 which is recessed to an inner side in the radial direction.

Figure 9A:
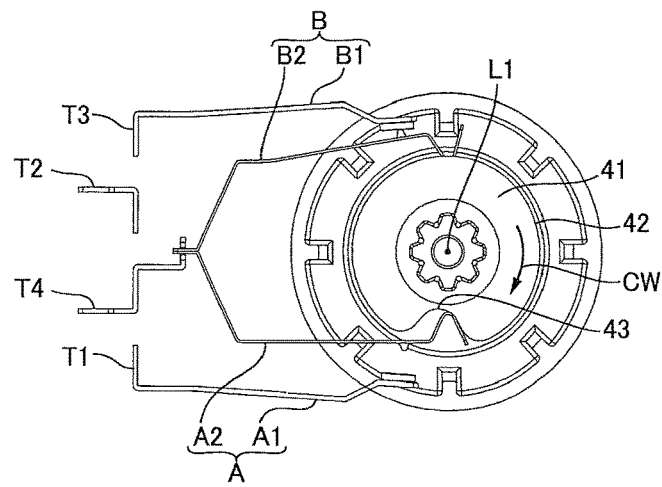
FIGS. 9A, 9B and 9C are explanatory views showing a first switch, a second switch and a switch opening and closing member.
Figure 9B:
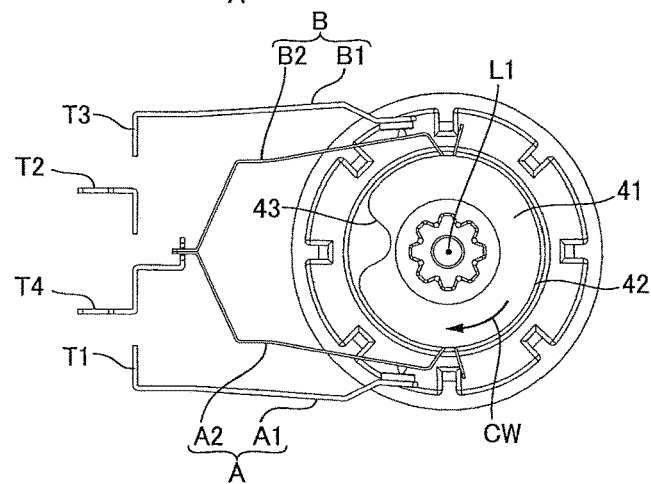
Figure 9C:
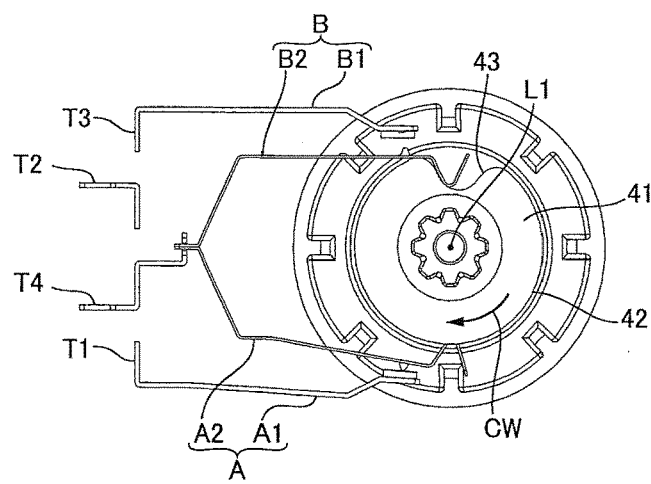

FIGS. 9A, 9B and 9C are explanatory views showing the first switch "A", the second switch "B" and the rotation cam 41. FIGS. 9A, 9B and 9C are plan views which are viewed from a lower side of the clutch device 10 (first rotor body 13 side). As shown in FIG. 3 and FIGS. 9A, 9B and 9C, the first switch "A" includes a first stationary plate "A1" disposed to an outer peripheral side of the rotation cam 41 and a first movable plate "A2" which is disposed between the first stationary plate "A1" and a cam face 42 facing the first stationary plate "A1". The first movable plate "A2" is urged toward the cam face 42. The first stationary plate "A1" structures one of contact point electrodes of the first switch "A" and the first movable plate "A2" structures the other of the contact point electrodes of the first switch "A".

The second switch "B" is symmetrically structured with the first switch "A" across the rotation cam 41. In other words, the second switch "B" includes a second stationary plate "B1" disposed to an outer peripheral side of the rotation cam 41 and a second movable plate "B2" which is disposed between the second stationary plate "B1" and a cam face 42 facing the second stationary plate "B1". The second movable plate "B2" is urged toward the cam face 42. The second stationary plate "B1" structures one of contact point electrodes of the second switch "B" and the second movable plate "B2" structures the other of the contact point electrodes of the second switch "B". The first movable plate "A2" and the second movable plate "B2" are contacted with the cam face 42 at angular positions separated by 180 degrees with the rotation center axis "L1" of the rotation cam 41 as a reference.

When the synchronous motor 37 is driven, the rotation cam 41 is turned in the clockwise direction CW with the rotation center axis "L1" as a center together with the rotation member 61 of the conversion mechanism 38. As shown in FIG. 9A, when the first movable plate "A2" is fallen into the recessed part 43 of the cam face 42, a contact point of the first movable plate "A2" of the first switch "A" is separated from a contact point of the first stationary plate "A1" to be set in an "OFF" state. As shown in FIGS. 9B and 9C, when the first movable plate "A2" is contacted with and slid on a part of the cam face 42 except the recessed part 43, the contact points of the first movable plate "A2" and the first stationary plate "A1" are contacted with each other and thus the first switch "A" is set to be an "ON" state.

When the rotation cam 41 is turned by 180 degrees from the state in FIG. 9A, the second movable plate "B2" of the second switch "B" is fallen into the recessed part 43 as shown in FIG. 9C and a contact point of the second movable plate "B2" is separated from a contact point of the second stationary plate "B1" and the second switch "B" is set to be an "OFF" state. When the second movable plate "B2" of the second switch "B" is contacted with and slid on a part of the cam face 42 except the recessed part 43 as shown in FIGS. 9A and 9B, the contact points of the second movable plate "B2" and the second stationary plate "B1" are contacted with each other to be an "ON" state.

The first switch "A", the second switch "B" and the rotation cam 41 are structured so that, when the eccentric pin 60 provided in the rotation member 61 is located at the first rotation position 60A, the first movable plate "A2" is fallen into the recessed part 43 and, when the eccentric pin 60 is located at the second rotation position 60B, the second movable plate "B2" is fallen into the recessed part 43. In other words, the first switch "A" is, as shown in FIG. 9A, turned to an "OFF" state when the lever part 46 of the swing member 34 is moved to the first position 46A that is one end in the reciprocating swing range. Further, the second switch "B" is, as shown in FIG. 9C, turned to an "OFF" state when the lever part 46 is moved to the second position 46B that is the other end in the reciprocating swing range. Therefore, it can be detected by an OFF signal of the first switch "A" that the swing member 34 is moved to the connecting position 34A and the clutch device 10 has been set in a connecting state. Further, it can be detected by an OFF signal of the second switch "B" that the swing member 34 is moved to the disconnecting position 34B and the clutch device 10 has been set in a disconnecting state.

Four metal plates (movable plate and stationary plate) structuring the first switch "A" and the second switch "B" are extended from both sides of the rotation cam 41 toward the terminal part 44 provided in an end part of the mechanism mounting part 30B. The first stationary plate "A1" and the second stationary plate "B1" of the four metal plates are connected with the terminal part 44. Four connector parts 44a through 44d are provided in the terminal part 44. The first stationary plate "A1" is electrically connected with a first terminal "T1" disposed in the connector part 44a. The second stationary plate "B1" is electrically connected with a third terminal "T3" disposed in the connector part 44c. Further, a fourth terminal "T4" disposed in the connector part 44d is electrically connected with one of a first and a second drive wires for supplying electric power to the synchronous motor 37. The first movable plate "A2" and the second movable plate "B2" are electrically connected with the fourth terminal "T4". In other words, the first movable plate "A2" and the second movable plate "B2" are electrically connected with one of the first and the second drive wires for supplying electric power to the synchronous motor 37 through the fourth terminal "T4". On the other hand, connecting second terminal "T2" disposed in the connector part 44b is connected with the other of the first and the second drive wires for supplying electric power to the synchronous motor 37 and is connected with a power supply for driving the synchronous motor 37.

(Drive Embodiments of Clutch Device)

Figure 10:
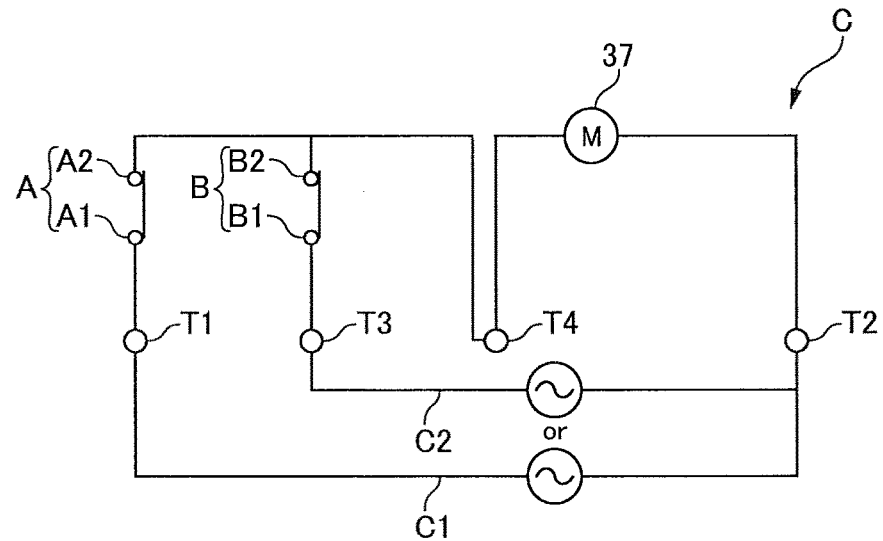
FIGS. 10A and 10B are explanatory views showing drive embodiments for a clutch device.
Figure 10:
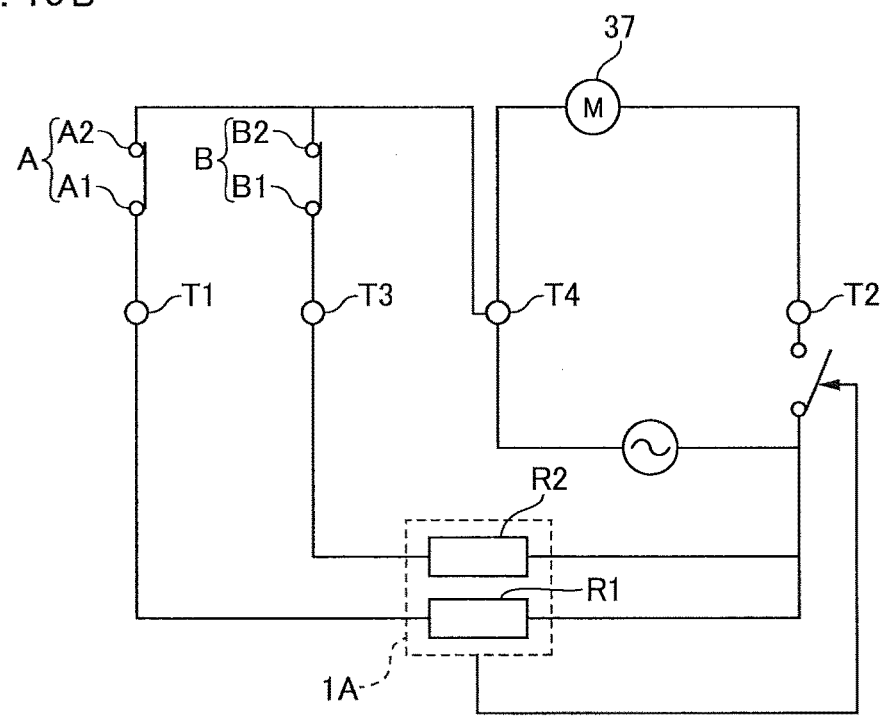

FIGS. 10A and 10B are explanatory views showing drive embodiments of the clutch device 10. FIG. 10A shows a first drive embodiment in which the first and the second switches "A" and "B" are provided in a power feeding circuit "C" to the synchronous motor 37. FIG. 10B shows a second drive embodiment in which signals from the first and the second switches "A" and "B" are outputted to the outside of the clutch device 10. The power feeding circuit "C" includes the synchronous motor 37, a power supply for driving the synchronous motor 37, and a switch for switching on and off the power supply to the synchronous motor 37. In the embodiment in FIG. 10A, the power feeding circuit "C" includes a first power feeding circuit "C1" provided with the first switch "A" and a second power feeding circuit "C2" provided with the second switch "B". In other words, the first power feeding circuit "C1" is a circuit which is structured so that one of contact points of the first switch "A" and a power supply are connected with each other through the first terminal "T1", the synchronous motor 37 and the power supply are connected with each other through the second terminal "T2", and the other of the contact points of the first switch "A" and the synchronous motor 37 are connected with each other through the fourth terminal "T4". Further, the second power feeding circuit "C2" is a circuit which is structured so that one of contact points of the second switch "B" and a power supply are connected with each other through the third terminal "T3", the synchronous motor 37 and the power supply are connected with each other through the second terminal "T2", and the other of the contact points of the second switch "B" and the synchronous motor 37 are connected with each other through the fourth terminal "T4". The first power feeding circuit "C1" and the second power feeding circuit "C2" of the power feeding circuit "C" are respectively circuits in which a pair of drive lines (first and second drive lines) connected with the same power supply is connecting with the synchronous motor 37 through these terminals and the synchronous motor 37 is rotated by electric power supplied to the synchronous motor 37 through the first and the second drive lines.

Figure 11A:
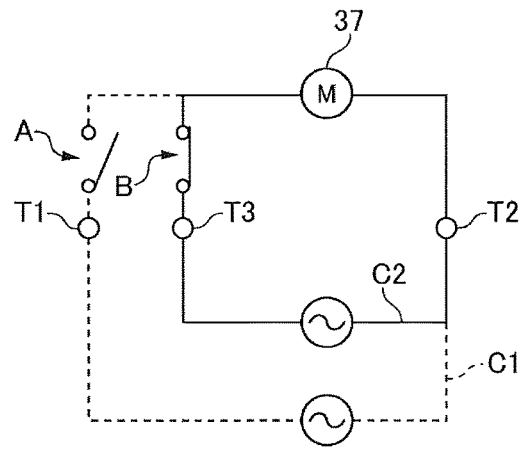
FIGS. 11A, 11B and 11C are explanatory views showing states of a first and a second switches and power feeding states to a power feeding circuit when a clutch device is switched from a connecting state to a disconnecting state in a first drive embodiment.
Figure 11B:
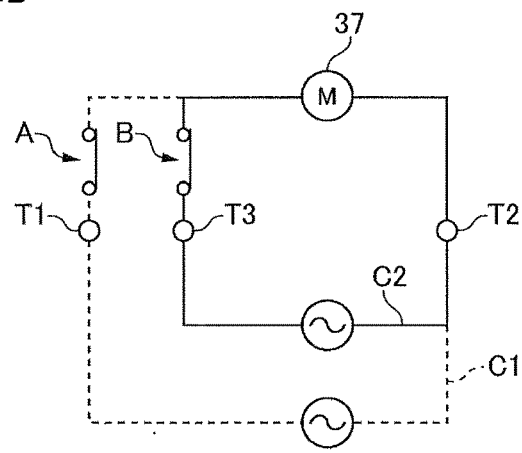
Figure 11C:
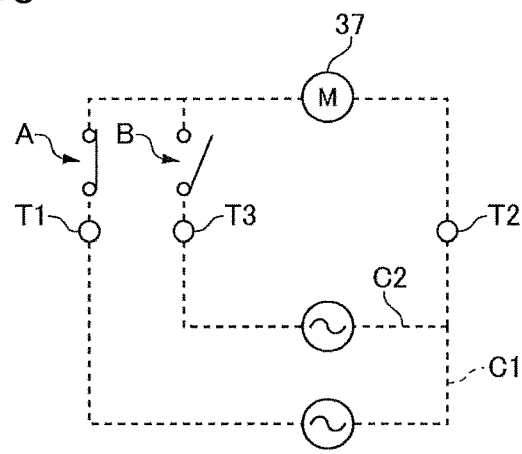

FIGS. 11A, 11B and 11C are explanatory views showing states of the first and the second switches "A" and "B" and power feeding states in the power feeding circuit "C" when the clutch device 10 is switched from the connecting state to the disconnecting state in the first drive embodiment shown in FIG. 10A. In the connecting state, the swing member 34 is located at the connecting position 34A and the lever part 46 of the swing member 34 has been moved to the first position 46A that is one end in the reciprocating swing range and thus, as shown in FIG. 9A, the first switch "A" is in an "OFF" state and the second switch "B" is in an "ON" state. In this case, as shown in FIG. 11A, power feeding to the synchronous motor 37 is started by the second power feeding circuit "C2". When the rotation cam 41 starts to turn, as shown in FIG. 11B, both of the first switch "A" and the second switch "B" are set to be "ON". When energization and driving to the synchronous motor 37 are further continued, the swing member 34 is reached to the disconnecting position 34B and the lever part 46 is moved to the second position 46B that is the other end in the reciprocating swing range and the second switch "B" is turned to be "OFF". As a result, as shown in FIG. 11C, the second power feeding circuit "C2" is cut off and power feeding is stopped and thus the synchronous motor 37 is stopped. In other words, when the swing member 34 is reached to the disconnecting position 34B, the synchronous motor 37 is automatically stopped and the swing member 34 is held at the disconnecting position 34B and the clutch device 10 is set to be the disconnecting state.

Figure 12A:
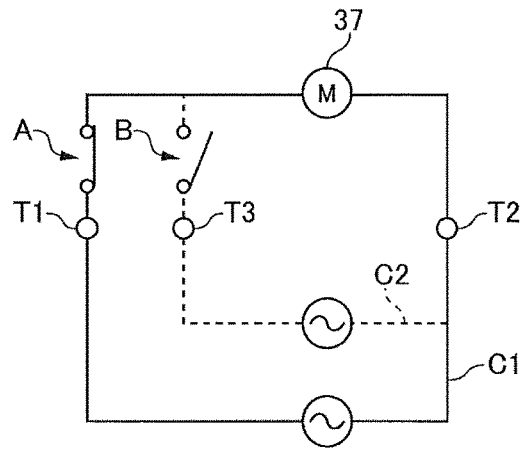
FIGS. 12A, 12B and 12C are explanatory views showing states of a first and a second switches and power feeding states to a power feeding circuit when a clutch device is switched from a disconnecting state to a connecting state in a first drive embodiment.
Figure 12B:
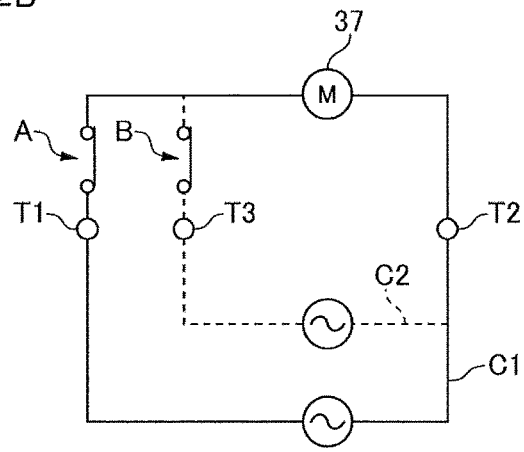
Figure 12C:
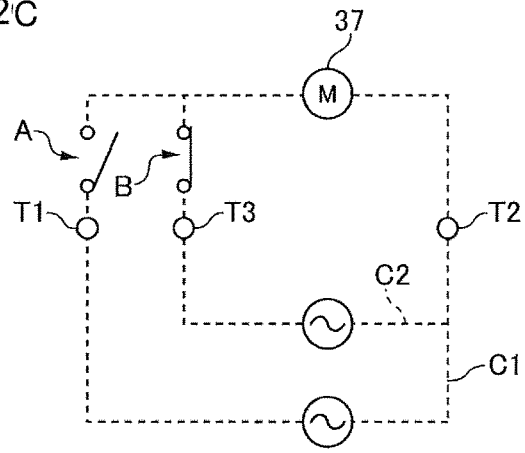

FIGS. 12A, 12B and 12C are explanatory views showing states of the first and the second switches "A" and "B" and power feeding states in the power feeding circuit "C" when the clutch device 10 is switched from the disconnecting state to the connecting state in the first drive embodiment. In the disconnecting state, the swing member 34 is located at the disconnecting position 34B and the lever part 46 of the swing member 34 has been moved to the second position 46B that is the other end in the reciprocating swing range and thus, as shown in FIG. 9C, the first switch "A" is in an "ON" state and the second switch "B" is in an "OFF" state. In this case, as shown in FIG. 12A, power feeding to the synchronous motor 37 is started by the first power feeding circuit "C1". When the rotation cam 41 starts to turn, as shown in FIG. 12B, both of the first switch "A" and the second switch "B" are set to be "ON". When energization and driving to the synchronous motor 37 are further continued, the swing member 34 is reached to the connecting position 34A and the lever part 46 is moved to the first position 46A that is the one end in the reciprocating swing range and the first switch "A" is turned to be "OFF". As a result, as shown in FIG. 12C, the first power feeding circuit "C1" is cut off and power feeding is stopped and thus the synchronous motor 37 is stopped. In other words, when the swing member 34 is reached to the connecting position 34A, the synchronous motor 37 is automatically stopped and the swing member 34 is held at the connecting position 34A and the clutch device 10 is set to be the connecting state.

As described above, in a case that the first switch "A" and the second switch "B" are provided in the power feeding circuit "C", when power feeding to the synchronous motor 37 is started by the first power feeding circuit "C1" or the second power feeding circuit "C2" and, when operation for switching connection and disconnection of the clutch device 10 has been completed, the switch of the power feeding circuit where power feeding is performed is cut off and operation of the clutch device 10 is stopped. Therefore, connection and disconnection of the clutch device 10 can be switched without performing complicated control such as controlling of a power feeding time period or judging of connection and disconnection of the clutch device 10 by detecting a position of a member. Further, when next connection and disconnection switching is to be performed, the power feeding circuit which was used for previous switching is in an off state and thus, the other power feeding circuit is energized to activate the synchronous motor 37. After that, when power feeding is continued until the switch of the power feeding circuit being energized is cut off, connection and disconnection of the clutch device 10 can be switched. In other words, in order to repeatedly perform connection and disconnection of the clutch device 10, it is sufficient that electric power is alternately supplied to the first power feeding circuit "C1" and the second power feeding circuit "C2" and its control is simple.

Next, a second embodiment shown in FIG. 10B is structured so that a power feeding circuit "C" to the synchronous motor 37 does not use the first and the second switches "A" and "B" and that signals from the first stationary plate "A1" and the second stationary plate "B1" of the first and the second switches "A" and "B" are outputted to the outside of the clutch device 10. For example, signals from the first and the second switches "A" and "B" are inputted to a control section 1A for controlling respective parts of the washing machine 1 (see FIG. 1 and FIG. 10B). Specifically, a relay R1 of the control section 1A is disposed between the first terminal "T1" and the second terminal "T2" and a relay R2 of the control section 1A is disposed between the third terminal "T3" and the second terminal "T2". Further, in the control section 1A, a switch of a power feeding circuit "C" is operated based on a signal from the first and the second switches "A" and "B" to drive and control the synchronous motor 37. Specifically, based on signals from the first and the second switches "A" and "B", a switch provided between the second terminal "T2" and a power supply is turned on or off. In this embodiment, based on signals from the first and the second switches "A" and "B", it can be detected whether the swing member 34 is located at the connecting position 34A, the disconnecting position 34B or another position in the control section 1A. Therefore, based on the detected result, it can be determined whether switching of connection and disconnection of the clutch device 10 has been completed or not and power feeding to the synchronous motor 37 can be controlled. Alternatively, power feeding is performed for a predetermined setting time to drive the synchronous motor 37 and thereby connection and disconnection of the clutch device 10 can be performed.

(Principal Operations and Effects in this Embodiment)

In the clutch device 10 of the washing machine 1 in this embodiment, the swing member 34 is reciprocatedly swung based on rotation of the synchronous motor 37 and thereby the second rotor body 20 is engaged with or separated from the first rotor body 13 to switch connection and disconnection of the clutch device 10. Further, the first and the second switches "A" and "B" are mechanically opened or closed by the rotation cam 41 interlocked with connection and disconnection of the clutch device 10 and the first and second switches "A" and "B" are capable of being connected with the power feeding circuit "C" to the synchronous motor 37. Therefore, the synchronous motor 37 can be directly driven and controlled by the first and the second switches "A" and "B" depending on the connecting and disconnecting states of the clutch device 10. Further, the first and the second switches "A" and "B" can be connected with an external control circuit such as the control section 1A of the washing machine 1 and thus, based on signals from the two switches, the synchronous motor 37 can be driven and controlled by the external control circuit. Therefore, various drive control systems can be utilized and its versatility is high.

(Modified Embodiments)

(1) In the embodiment described above, the clutch device 10 is provided with the terminal part 44 for connecting with switches, a power supply, a motor and the like by using a connector. However, lead wires may be utilized for connection without using a connector.

Figure 13:
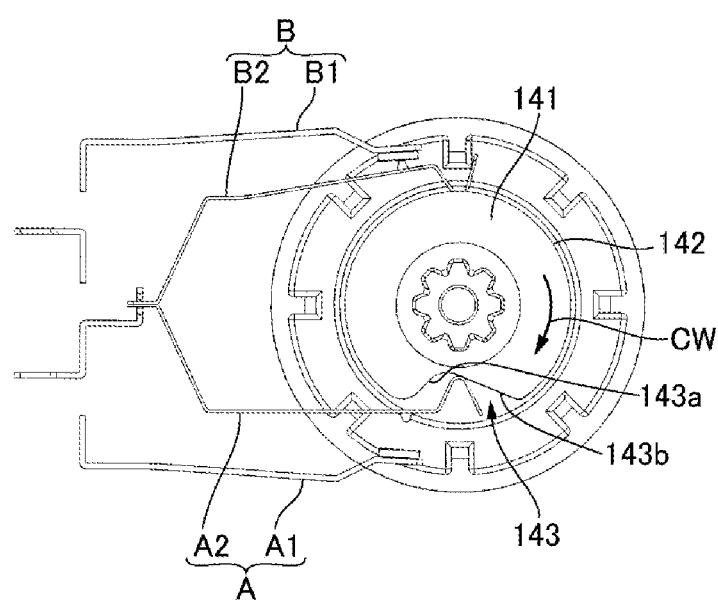
FIG. 13 is an explanatory view showing a rotation cam in a modified example.

(2) FIG. 13 is an explanatory view showing a rotation cam in a modified example. A rotation cam 141 in the modified example is different from the above-mentioned embodiment in a shape of a recessed part 143 formed in a cam face 142. The recessed part 43 in the embodiment described above is formed in a symmetric shape in a circumferential direction. However, the recessed part 143 in this embodiment is formed in an asymmetric shape in a circumferential direction. As shown in FIG. 13, the recessed part 143 is provided with an inclined face 143a on a front side in a turning direction (clockwise direction CW) of the rotation cam 141 and an inclined face 143b on a rear side in the turning direction, and inclination of the inclined face 143a on the front side is larger than that of the inclined face 143b on the rear side. When the rotation cam 141 is turned in one direction in a clockwise direction CW, the first movable plate "A2" or the second movable plate "B2" is fallen into an inner side in a radial direction along the inclined face 143a on the front side in the turning direction and, after that, the first movable plate "A2" or the second movable plate "B2" is lifted to an outer side in the radial direction along the inclined face 143b on the rear side in the turning direction.

In this modified example, the inclination of the inclined face 143a on the front side in a turning direction (clockwise direction CW) is set to be larger (steeper) than the inclination of the inclined face 143b on the rear side. Therefore, when the first movable plate "A2" or the second movable plate "B2" is fallen into the recessed part 143 and the first switch "A" or the second switch "B" is turned off, the contact point of the switch is rapidly separated. Accordingly, the contact point of the switch can be suppressed from being in an unstable contact state. As a result, in a structure that power feeding to the synchronous motor 37 for driving the clutch device 10 is controlled by on and off of the switch, chattering of a power supply for the synchronous motor 37 can be suppressed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A clutch device structured to connect and disconnect transmission of a rotation drive force from a motor to a washing tub, the clutch device comprising:
 a first rotor body to which the rotation drive force of the motor is transmitted;
 a second rotor body which is engageable with the first rotor body;
 a clutch drive motor which is connected with a first drive line and a second drive line and is structured to be rotated by electric power supplied through the first drive line and the second drive line;
 a clutch mechanism which is driven by the clutch drive motor to perform switching between a connecting state where the rotation drive force is transmitted from the first rotor body to the second rotor body and a disconnecting state where the connecting state is released;
 a first switch which is switched from an "ON" state to an "OFF" state when switched from the connecting state to the disconnecting state, the first switch comprising first and second contact point electrodes;
 a second switch which is switched from an "ON" state to an "OFF" state when switched from the disconnecting state to the connecting state, the second switch comprising first and second contact point electrodes;
 a first terminal which is electrically connected with the first contact point electrode of the first switch;
 a second terminal which is electrically connected with the first drive line;
 a third terminal which is electrically connected with the first contact point electrode of the second switch; and
 a fourth terminal which is electrically connected with the second drive line;
 wherein the second contact point electrode of the first switch and the second contact point electrode of the second switch are electrically connected with the second drive line.

2. The clutch device according to claim 1, wherein the clutch mechanism comprises:
 a rotation member which is driven by the clutch drive motor; and
 a swing member which is structured to be reciprocatedly swung over a constant angular range based on rotation of the rotation member to move the second rotor body between a connecting position where the second rotor body is engaged with the first rotor body and a disconnecting position where engagement of the second rotor body with the first rotor body is released;
 the first rotor body and the second rotor body are coaxially disposed so as to be superposed on each other in an axial line direction of the washing tub,
 the swing member is overlapped with the second rotor body in the axial line direction and is disposed so as to swing with a swing center line coincided with rotation center lines of the first rotor body and the second body as a center,
 the swing member is formed on one side in the axial line direction with a plurality of first cam faces of a cam mechanism structured to move the second rotor body in a direction approached to and separated from the first rotor body, and
 the plurality of first cam faces is disposed with equal angular intervals with the swing center line as a center.

3. The clutch device according to claim 2, wherein the swing member is structured so that the swing member is reciprocatedly swung over the constant angular range by being moved by an eccentric pin provided in the rotation member and thereby the swing member is moved in the axial line direction between the connecting position and the disconnecting position,
 the eccentric pin is passed through a first rotation position and a second rotation position in tangential directions parallel to an imaginary line which is formed by connecting a rotation center of the rotation member and a swing center of the swing member, and
 when the eccentric pin is passed one of the first rotation position and the second rotation position, the swing member is moved to the connecting position and, when passing the other of the first rotation position and the second rotation position, the swing member is moved to the disconnecting position.

4. The clutch device according to claim 3, wherein the clutch mechanism comprises a plurality of second cam faces, each of the plurality of second cam faces facing one of the plurality of first cam faces, and
each second cam face of the plurality of second cam faces comprises:
 a connecting position holding cam face which is extended in a circumferential direction so that its normal direction is directed in a direction parallel to the axial line and which holds the second rotor body at the connecting position; and
 a disconnecting position holding cam face which is extended in the circumferential direction so that its normal direction is directed in a direction parallel to the axial line and which holds the second rotor body at the disconnecting position.

5. The clutch device according to claim 2, wherein the clutch mechanism comprises a plurality of second cam faces, each of the plurality of second cam faces facing one of the plurality of first cam faces, and
each second cam face of the plurality of second cam faces comprises:
 a connecting position holding cam face which is extended in a circumferential direction so that its normal direction is directed in a direction parallel to the axial line and which holds the second rotor body at the connecting position; and
 a disconnecting position holding cam face which is extended in the circumferential direction so that its normal direction is directed in a direction parallel to the axial line and which holds the second rotor body at the disconnecting position.

6. The clutch device according to claim 1, further comprising:
 a rotation cam which is rotationally driven by the clutch drive motor;
 a first movable plate which structures the second contact point electrode of the first switch and which contacts with a cam face of the rotation cam in an urged state toward the cam face; and
 a second movable plate which structures the second contact point electrode of the second switch and which contacts with the cam face in an urged state toward the cam face,
 wherein a first inclined face of the cam face for moving the first movable plate and the second movable plate from an "ON" position to an "OFF" position is steeper in inclination than a second inclined face for moving the first movable plate and the second movable plate from the "OFF" position to the "ON" position.

7. The clutch device according to claim 6, wherein the clutch mechanism comprises:
a rotation member which is driven by the clutch drive motor; and
a swing member which is structured to be reciprocatedly swung over a constant angular range based on rotation of the rotation member to move the second rotor body between a connecting position where the second rotor body is engaged with the first rotor body and a disconnecting position where engagement of the second rotor body with the first rotor body is released;
the first rotor body and the second rotor body are coaxially disposed so as to be superposed on each other in an axial line direction of the washing tub,
the swing member is overlapped with the second rotor body in the axial line direction and is disposed so as to swing with a swing center line coincided with rotation center lines of the first rotor body and the second body as a center,
the swing member is formed on one side in the axial line direction with a plurality of first cam faces of a cam mechanism structured to move the second rotor body in a direction approached to and separated from the first rotor body, and
the plurality of the first cam faces is disposed with equal angular intervals with the swing center line as a center.

8. The clutch device according to claim 7, wherein the swing member is structured so that the swing member is reciprocatedly swung over the constant angular range by being moved by an eccentric pin provided in the rotation member and thereby the swing member is moved in the axial line direction between the connecting position and the disconnecting position,
the eccentric pin is passed through a first rotation position and a second rotation position in tangential directions parallel to an imaginary line which is formed by connecting a rotation center of the rotation member and a swing center of the swing member, and
when the eccentric pin is passed one of the first rotation position and the second rotation position, the swing member is moved to the connecting position and, when passing the other of the first rotation position and the second rotation position, the swing member is moved to the disconnecting position.

9. A washing machine comprising:
a clutch device structured to connect and disconnect transmission of a rotation drive force from a motor to a washing tub, the clutch device comprising:
a first rotor body to which the rotation drive force of the motor is transmitted;
a second rotor body which is engageable with the first rotor body;
a clutch drive motor which is connected with a first drive line and a second drive line and is structured to be rotated by electric power supplied through the first drive line and the second drive line;
a clutch mechanism which is driven by the clutch drive motor to perform switching between a connecting state where the rotation drive force is transmitted from the first rotor body to the second rotor body and a disconnecting state where the connecting state is released;
a first switch which is switched from an "ON" state to an "OFF" state when switched from the connecting state to the disconnecting state, the first switch comprising first and second contact point electrodes;
a second switch which is switched from an "ON" state to an "OFF" state when switched from the disconnecting state to the connecting state, the second switch comprising first and second contact point electrodes;
a first terminal which is electrically connected with the first contact point electrode of the first switch;
a second terminal which is electrically connected with the first drive line;
a third terminal which is electrically connected with the first contact point electrodes of the second switch; and
a fourth terminal which is electrically connected with the second drive line;
wherein the second contact point electrode of the first switch and the second contact point electrode of the second switch are electrically connected with the second drive line;
the washing tub which is integrally rotated with the second rotor body; and
a pulsator which is integrally rotated with the first rotor body in an inside of the washing tub.

10. The washing machine according to claim 9, further comprising:
a first power feeding circuit which supplies electric power to the clutch drive motor through the first terminal and the second terminal when the first switch is set in an "ON" state; and
a second power feeding circuit which supplies electric power to the clutch drive motor through the second terminal and the third terminal when the second switch is set in an "ON" state.

11. The washing machine according to claim 9, further comprising:
a power feeding circuit which supplies electric power to the clutch drive motor through the second terminal and the fourth terminal; and
a controller which controls supply of electric power from the power feeding circuit based on an electric potential of the first terminal and an electric potential of the second terminal.

12. The washing machine according to claim 9, wherein the clutch mechanism comprises:
a rotation member which is driven by the clutch drive motor; and
a swing member which is structured to be reciprocatedly swung over a constant angular range based on rotation of the rotation member to move the second rotor body between a connecting position where the second rotor body is engaged with the first rotor body and a disconnecting position where engagement of the second rotor body with the first rotor body is released;
the first rotor body and the second rotor body are coaxially disposed so as to be superposed on each other in an axial line direction of the washing tub,
the swing member is overlapped with the second rotor body in the axial line direction and is disposed so as to swing with a swing center line coincided with rotation center lines of the first rotor body and the second body as a center,
the swing member is formed on one side in the axial line direction with a plurality of first cam faces of a cam mechanism structured to move the second rotor body in a direction approached to and separated from the first rotor body, and the plurality of the first cam faces is disposed with equal angular intervals with the swing center line as a center.

13. The washing machine according to claim 12, wherein the swing member is structured so that the swing member is reciprocatedly swung over the constant angular range by being moved by an eccentric pin provided in the rotation member and thereby the swing member is moved in the axial line direction between the connecting position and the disconnecting position, the eccentric pin is passed through a first rotation position and a second rotation position in tangential directions parallel to an imaginary line which is formed by connecting a rotation center of the rotation member and a swing center of the swing member, and when the eccentric pin is passed one of the first rotation position and the second rotation position, the swing member is moved to the connecting position and, when passing the other of the first rotation position and the second rotation position, the swing member is moved to the disconnecting position.

14. The washing machine according to claim 9, wherein the clutch device further comprises:

a rotation cam which is rotationally driven by the clutch drive motor;

a first movable plate which structures the second contact point electrode of the first switch and which contacts with a cam face of the rotation cam in an urged state toward the cam face; and a second movable plate which structures the second contact point electrode of the second switch and which contacts with the cam face in an urged state toward the cam face, and a first inclined face of the cam face for moving the first movable plate and the second movable plate from an "ON" position to an "OFF" position is steeper in inclination than a second inclined face for moving the first movable plate and the second movable plate from the "OFF" position to the "ON" position.

* * * * *